B. FORD.
SECONDARY OR STORAGE BATTERY.
APPLICATION FILED FEB. 11, 1915.
1,230,393. Patented June 19, 1917.
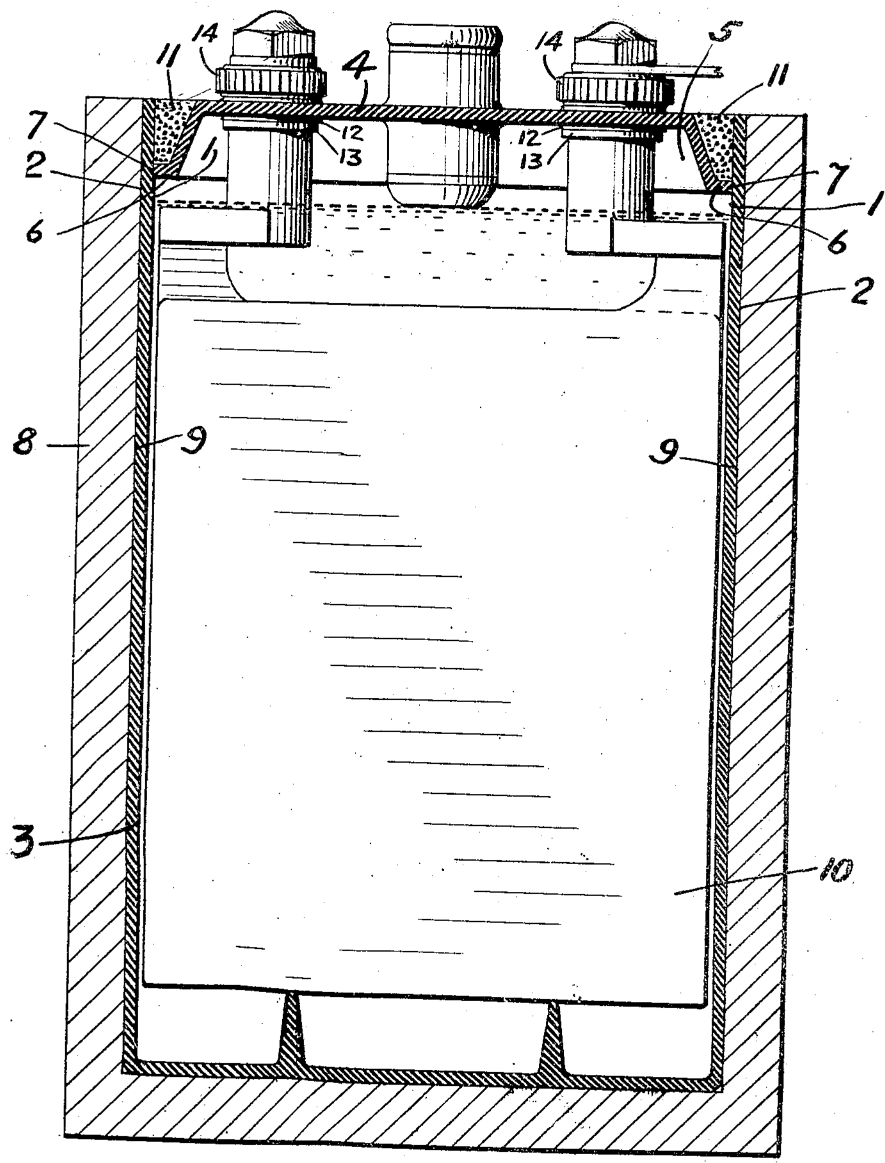
WITNESSES:
Robt R. Kitchel
Frank E. French
INVENTOR
Bruce Ford
BY
Augustus B. Stoughton.
ATTORNEY.

UNITED STATES PATENT OFFICE.

BRUCE FORD, OF PHILADELPHIA, PENNSYLVANIA.

SECONDARY OR STORAGE BATTERY.

1,230,393. Specification of Letters Patent. Patented June 19, 1917.

Application filed February 11, 1915. Serial No. 7,468.

*To all whom it may concern:*

Be it known that I, BRUCE FORD, a citizen of the United States, residing at Philadelphia, in the county of Philadelphia and State of Pennsylvania, have invented certain new and useful Improvements in Secondary or Storage Batteries, of which the following is a specification.

The principal object of the present invention is to simplify the construction and arrangement of certain parts of storage batteries to the end that they will coöperate in an improved manner and form an efficient and comparatively inexpensive storage battery construction.

The invention will be claimed at the end hereof but will be first described in connection with the embodiment of it chosen for illustration in the accompanying drawings which show a transverse sectional view of a storage battery embodying features of the invention.

In the drawings the inside wall 1, and the outside wall 2, of the jar 3, are flat and straight. 4, is a cover dished as at 5, and having a marginal flange 6, of which the rim 7, contacts with the inside wall 1, of the jar below the top thereof. 8, is an outer box having inner side walls 9, arranged to contact with the outside walls of the jar to support the latter and keep them up to the rim 7, of the cover flange 6. It may be remarked that the jar is usually of rubber material or some other material which is more flexible and less rigid than the box 8, which may be constructed of wood or like material. 10, is a plate structure which supports the cover 4, and holds it against undesirable movement either upward or downward and in proper relation with respect to the top of the jar. As shown the cover is held upon the plate structure 10, by a locking nut 14, and by means of a gasket 12, as of rubber, supported by an appropriate flange 13. 11, is a seal or sealing compound interposed between the jar walls and the flange and cover. The fact that the jar and box walls are flat and straight simplifies and cheapens their construction while at the same time the arrangement and mutual inter-relation and coöperation of the parts provides an efficient and comparatively inexpensive closure.

What I claim is:

1. In a storage battery the combination of a jar, an inverted dished cover having a marginal flange of which the rim contacts with the inside wall of the jar below the top thereof, an outer box having inner side walls arranged to contact with the outside walls of the jar to support the latter and keep them up to the rim of the cover flange, and a plate structure secured to the cover to positively position it in respect to the top of the jar, substantially as described.

2. In a storage battery the combination of a jar having flat and straight inside and outside walls, a dished cover having a marginal flange of which the rim contacts with the flat inside wall of the jar below the top thereof, an outer box having flat faced inner side walls arranged to contact with the flat outside walls of the jar to support the latter and keep them up to the rim of the cover flange, a plate structure, means engaging the plate structure and cover to hold the latter down, and means engaging the plate structure and cover to hold the latter up.

3. In a storage battery the combination of a jar having flat and straight inside and outside walls, a dished cover having a marginal flange of which the rim contacts with the flat inside wall of the jar below the top thereof, an outer box having flat faced inner side walls arranged to contact with the flat outside walls of the jar to support the latter and keep them up to the rim of the cover flange, a plate structure secured to the cover to positively position it in respect to the top of the jar, and a sealing compound interposed between the jar walls and flange and cover, substantially as described.

4. In a storage battery the combination of a jar having flat and straight inside and outside walls, a dished cover having a marginal flange of which the rim contacts with the flat inside wall of the jar below the top thereof, an outer box having flat faced inner side walls arranged to contact with the flat outside walls of the jar to support the latter and keep them up to the rim of the cover flange, a plate structure, means engaging the plate structure and cover to hold the latter down, means engaging the plate structure and cover to hold the latter up, and a sealing compound interposed between the jar walls and flange and cover, substantially as described.

5. In a storage battery the combination of jar, an inverted dished cover having a marginal flange of which the rim contacts with the inside wall of the jar below the top thereof, an outer box having inner side walls arranged to contact with the outside walls of the jar to support the latter and keep them up to the rim of the cover flange, a plate structure engaging the cover to hold it in respect to the top of the jar, a seal between the plate structure and cover, and a sealing compound interposed between the jar walls and flange and cover, substantially as described.

6. In a storage battery the combination of a jar, a dished cover having a marginal flange of which the rim contacts with the inside wall of the jar below the top thereof, an outer box having inner side walls arranged to contact with the outside walls of the jar to support the latter and keep them up to the rim of the cover flange, a plate structure, a flange on the structure and a gasket and a nut for connecting and sealing the plate structure and cover, and a sealing compound interposed between the jar walls and flange and cover, substantially as described.

In testimony whereof I have hereunto signed my name in the presence of two witnesses.

BRUCE FORD.

Witnesses:

CLIFFORD K. CASSEL,
FRANK E. FRENCH.